United States Patent [19]
York et al.

[11] Patent Number: 5,671,306
[45] Date of Patent: Sep. 23, 1997

[54] LIGHTING STRUCTURE FOR INTENSELY ILLUMINATING NARROW LINEAR REGION

[75] Inventors: Allan Brent York, Langley; Grant William Roland Harlow, Vancouver; George Everett Matheson, North Vancouver, all of Canada

[73] Assignee: TIR Systems Ltd., Burnaby, Canada

[21] Appl. No.: 361,133

[22] Filed: Dec. 21, 1994

[51] Int. Cl.[6] .................................................. G02B 6/34
[52] U.S. Cl. .................. 385/36; 385/33; 385/133; 385/901; 362/32
[58] Field of Search .................. 385/36, 146, 133, 385/901, 123, 129, 147, 33, 34; 362/32

[56] References Cited

U.S. PATENT DOCUMENTS

| 4,615,579 | 10/1986 | Whitehead | 385/146 |
| 5,339,382 | 8/1994 | Whitehead | 385/146 |

Primary Examiner—Phan T. H. Palmer
Attorney, Agent, or Firm—Oyen Wiggs Green & Mutala

[57] ABSTRACT

A lighting structure for intensely illuminating a narrow linear region. A light source emits light into an end of a hollow, elongate light guide. A longitudinal slit light-emitting aperture extends through an external wall of the light guide. A lens is mounted in the aperture. The lens bears a plurality of prisms which extend substantially perpendicular to the slit, on an inwardly directed face of the lens. The lens may be formed of a film material. A mechanism is provided to maintain the lens flat. A diffuser mounted outwardly of the lens bears a plurality of thin striations extending transversely, relative to the longitudinal slit aperture.

10 Claims, 2 Drawing Sheets

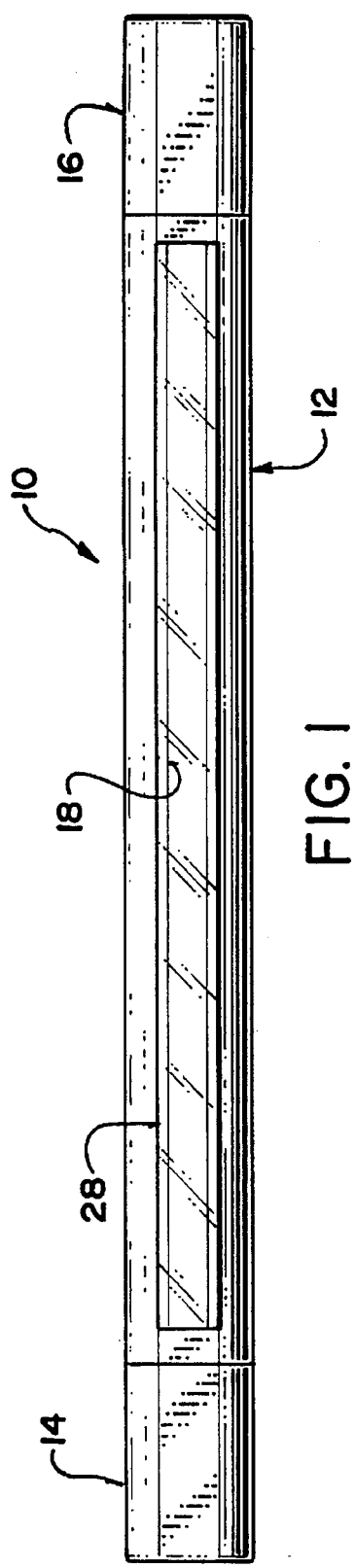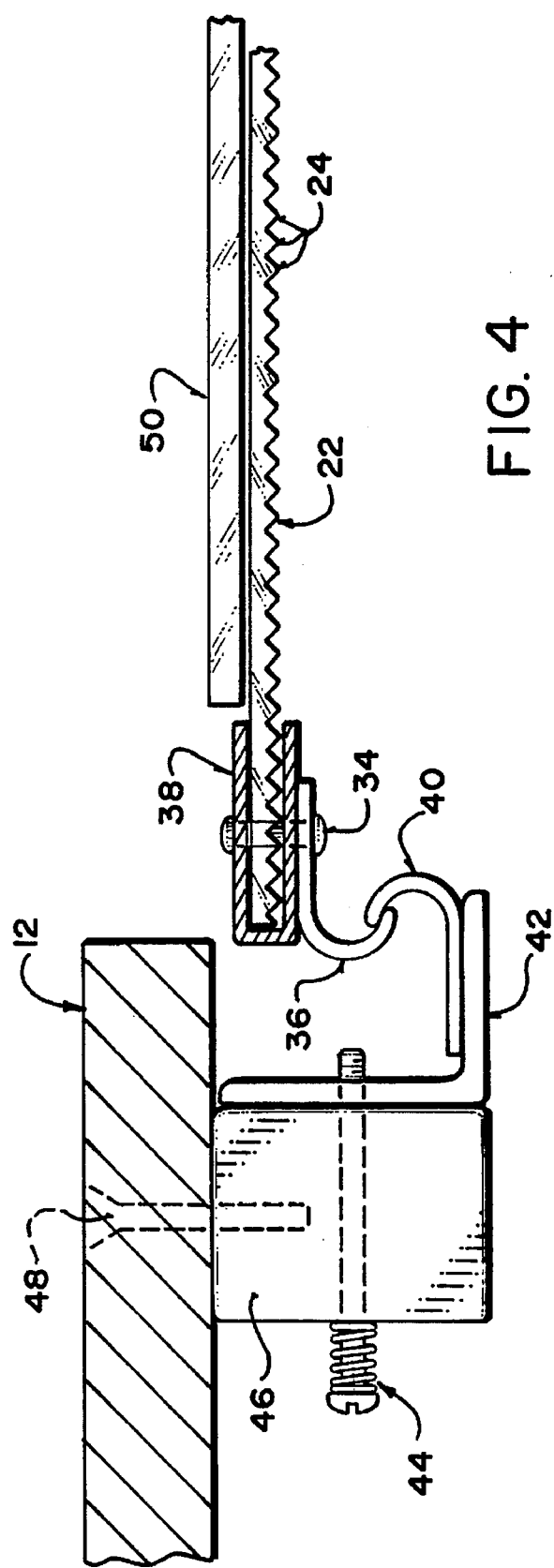

LIGHTING STRUCTURE FOR INTENSELY ILLUMINATING NARROW LINEAR REGION

FIELD OF THE INVENTION

This application pertains to a hollow light guide structure having a thin slit aperture. The inwardly directed face of a lens mounted in the aperture bears a plurality of prisms which extend substantially perpendicular to the slit. Light rays propagated along the guide are redirected by the prisms to intensely illuminate a narrow linear region.

BACKGROUND OF THE INVENTION

There are a variety of situations in which it is desirable to intensely illuminate a narrow linear region. Examples include "machine vision" systems such as optical scanning devices, photocopiers and robotic vision systems. The problem is to confine the light output of a light source to the desired narrow region. Some prior art solutions have employed expensive laser and/or holographic technologies. The present invention provides a simple, relatively inexpensive solution employing prismatic light guide technology.

U.S. Pat. No. 5,339,382 issued 16 Aug. 1994 discloses a prismatic light guide for emitting light in a particular direction, while restricting the angular range of the emitted light to less than ±20°. This range is said to be very useful in general down lighting applications and in the external illumination of outdoor signs. However, a much narrower angular range, on the order of ±5° is required to achieve practically useful results in machine vision applications.

The present invention provides a refined solution employing prismatic light guide technology capable of restricting the angular range of the emitted light to the preferred ±5° range. Unlike the structure of U.S. Pat. No. 5,339,382 the present invention requires no specially shaped and positioned internal light scattering mechanism for redirecting light into angles falling within the desired angular range. The present invention uses a simple metallic light guide, rather than a prism light guide as utilized by the structure of U.S. Pat. No. 5,339,382. Further, whereas the structure of U.S. Pat. No. 5,339,382 employs longitudinally oriented prisms to secondarily improve the direction in which light rays escape, the present invention uses substantially perpendicularly oriented prisms as a primary light escape mechanism.

SUMMARY OF THE INVENTION

In accordance with the preferred embodiment, the invention provides a lighting structure for intensely illuminating a narrow linear region. A light source emits light into an end of a hollow, elongate light guide. A longitudinal slit light-emitting aperture extends through an external wall of the light guide. A lens is mounted in the aperture. The lens bears a plurality of prisms which extend substantially perpendicular to the slit, on an inwardly directed face of the lens.

The lens may be formed of a film material such as TRAF™ material available from 3M Corporation, St. Paul, Minn. A mechanism may be provided to maintain the lens flat.

A diffuser may be mounted outwardly of the lens. The diffuser bears a plurality of thin striations extending transversely, relative to the longitudinal slit aperture.

BRIEF DESCRIPTION OF THE DRAWINGS

FIG. 1 is a front elevation view of a lighting structure constructed in accordance with the invention.

FIG. 4 is a further enlarged cross-sectional illustration of an end portion of the light guide depicted in FIG. 2, showing a mechanism for maintaining the prismatic film lens material flat.

DETAILED DESCRIPTION OF THE PREFERRED EMBODIMENT

Figure 2:
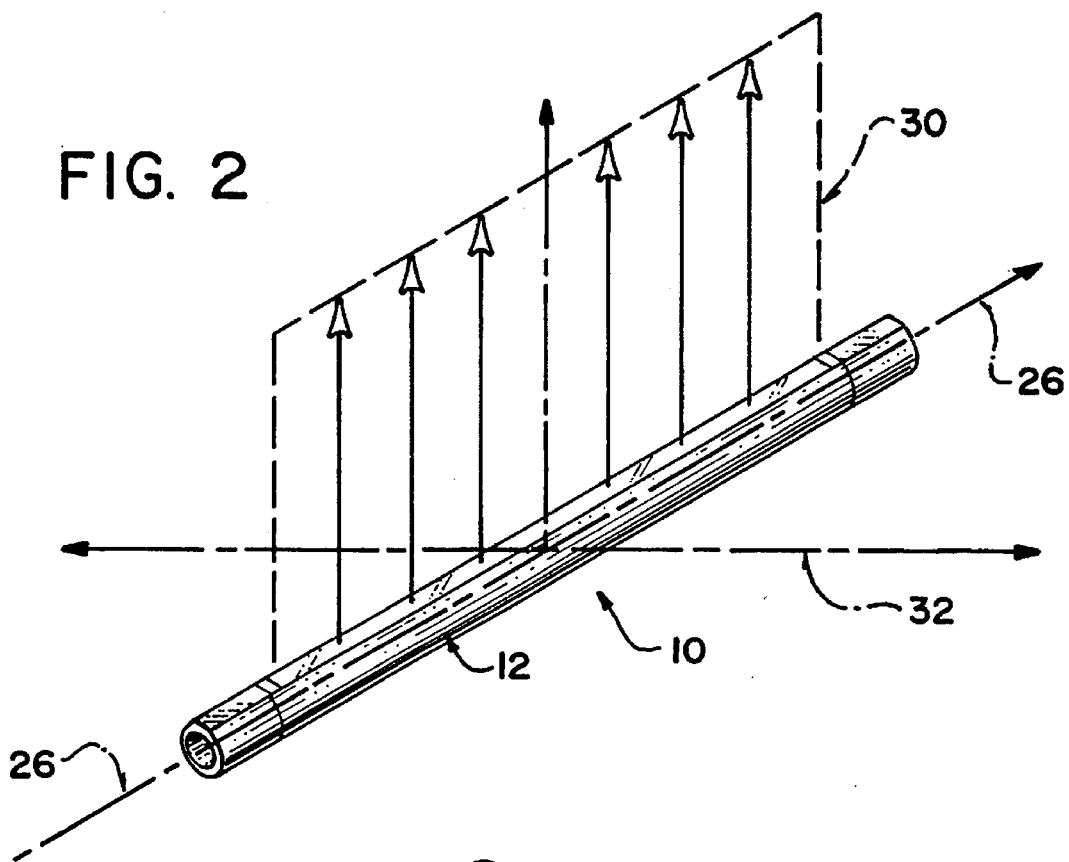
FIG. 2 is a pictorial illustration of the FIG. 1 lighting structure, showing a plane through which light output by the structure intensely illuminates a narrow linear region.
Figure 3:
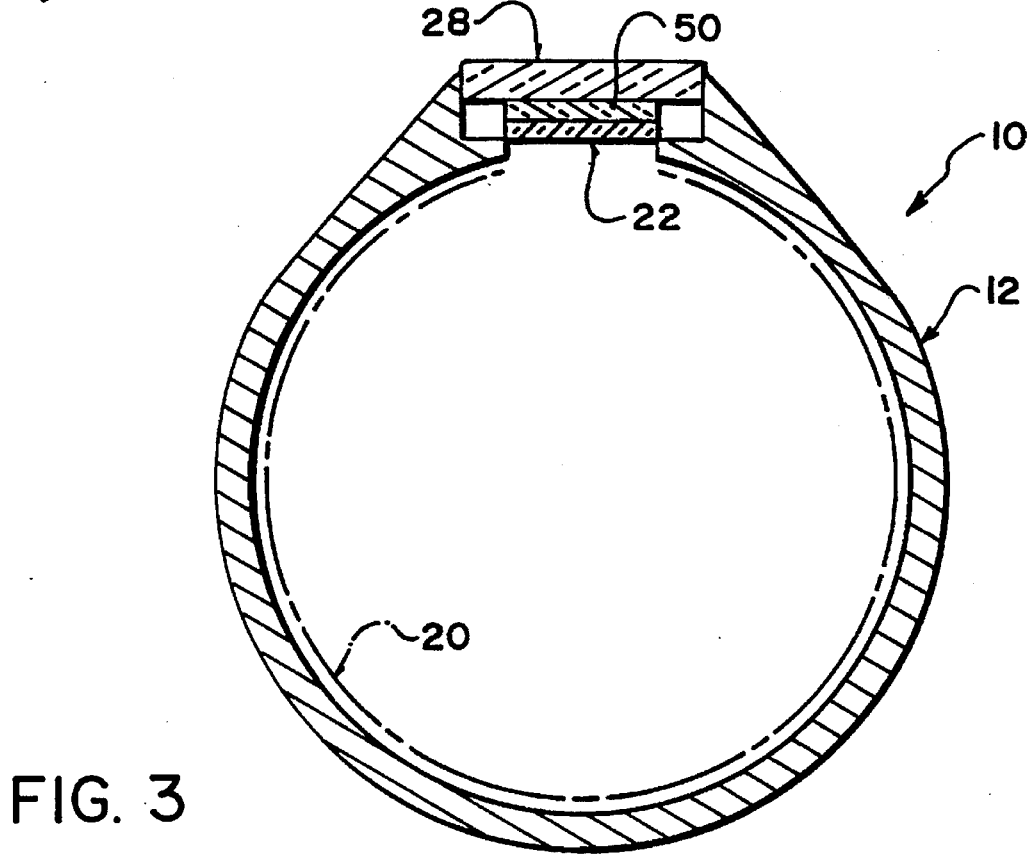
FIG. 3 is an enlarged cross-sectional illustration of the light guide depicted in FIG. 2.

The drawings depict a lighting structure 10 formed of a hollow, elongate light guide 12. A light source 14 emits light into an end of light guide 12. A second light source 16 may be provided to emit light into the opposite end of light guide 12. A thin, slit aperture 18 in the external wall of light guide 12 extends parallel to the longitudinal axis of light guide 12.

Light guide 12 may be an aluminum tube having a reflective internal surface 20. Preferably, but not essentially, surface 20 is specularly reflective. Light guide 12 is typically circular in cross-section, but other cross-sectional geometries, including rectangular or square may be used to form light guide 12.

A lens 22 is mounted in slit aperture 18. An inwardly directed face of lens 22 bears a plurality of parallel prisms 24 which extend substantially perpendicularly across aperture 18 (i.e. prisms 24 extend perpendicular to the longitudinal axis 26 of light guide 12). Cross web TRAF™ prismatic film material available from 3M Corporation, St. Paul, Minn. under product no. 75-0299-7554-9 may be used to form lens 22. A tempered glass shield 28 may be mounted outside lens 22 in aperture 18 to protect the lens.

Light rays emitted into light guide 12 by light source(s) 14 (and/or 16) are reflected by the light guide's internal surface 20 and are thus propagated along the light guide in the direction of its longitudinal axis 26. Some of the propagated rays strike the prism-bearing, inwardly directed face of lens 22. Such rays are either reflected by lens 22 for further propagation along light guide 12, or they are refracted through lens 22 and thus escape from lighting structure 10, or they are partially reflected and partially refracted. The escaping rays are redirected by the refractive properties of the prismatic material forming lens 22, such that the escaping rays lie substantially in a plane 30 which is both perpendicular to the light guide's longitudinal axis 26 and perpendicular to an orthogonal axis 32 extending parallel to the direction of extent of prisms 24 forming lens 22.

The prismatic film material forming lens 22 may be susceptible to thermal distortion which adversely affects the distribution of light output through aperture 18. Accordingly, it will in most cases be desirable to provide a mechanism for maintaining lens 22 flat. One such mechanism is depicted in FIG. 4, in which rivet 34 passes through first hook 36, clamp 38 and one end of lens material 22. First hook 36 engages second hook 40 which is fixed to bracket 42. Spring-loaded screw 44 adjustably positions bracket 42 relative to block 46, which is fastened to the interior wall of light guide 12 by machine screw 48. A similar mechanism is provided at the opposite end of light guide 12 to maintain the opposite end of the prismatic film material flat.

Although the foregoing structure can yield practically useful results, it will in some cases be desirable to provide a "lateral diffuser" element to remove localized variations by selectively diffusing the light output in only plane 30, without significantly diffusing light away from that plane.

This can be achieved by mounting a clear plastic diffuser sheet 50 in aperture 18, outside lens 22. The surface of diffuser 50 bears a plurality of minute striations which extend only in the direction perpendicular to the light guide's longitudinal axis 26. These striations effectively scatter the illumination in that direction, with little or no effect on light emitted perpendicular to that direction.

As will be apparent to those skilled in the art in the light of the foregoing disclosure, many alterations and modifications are possible in the practice of this invention without departing from the spirit or scope thereof. For example, although prisms 24 preferably extend as close to true perpendicular as possible to the longitudinal axis 26 of light guide 12, good results are obtained if prisms 24 extend within a preferred range of about ±10° off the perpendicular. Reduced, but acceptable functionality is obtained if prisms 24 extend within a range of about ±30° off the perpendicular. Accordingly, the scope of the invention is to be construed in accordance with the substance defined by the following claims.

What is claimed is:

1. A lighting structure for intensely illuminating a narrow linear region, said structure comprising:
   (a) a hollow, elongate light guide having a longitudinal axis;
   (b) a light source for emitting light into an end of said light guide;
   (c) a longitudinal slit light-emitting aperture extending through an external wall of said light guide substantially parallel to said axis; and,
   (d) a lens mounted in said slit aperture, said lens bearing a plurality of prisms extending substantially perpendicular to said slit on an inwardly directed face of said lens.

2. A lighting structure as defined in claim 1, wherein said lens is a film material.

3. A lighting structure for intensely illuminating a narrow linear region, said structure comprising:
   (a) a hollow, elongate light guide having a longitudinal axis;
   (b) a light source for emitting light into an end of said light guide;
   (c) a longitudinal slit light-emitting aperture extending through an external wall of said light guide substantially parallel to said axis;
   (d) a lens mounted in said slit aperture, said lens bearing a plurality of prisms extending substantially perpendicular to said slit on an inwardly directed face of said lens, said lens being a film material; and
   (e) a mechanism for maintaining said lens flat.

4. A lighting structure as defined in claim 1, 2 or 3 wherein said prisms extend at an angle within about ±30° of true perpendicular to said slit.

5. A lighting structure as defined in claim 1, 2 or 3 wherein said light guide is circular in cross-section.

6. A lighting structure as defined in claim 1, 2 or 3 further comprising a specularly reflective internal surface on said light guide.

7. A lighting structure as defined in claim 1, 2 or 3 wherein said prisms extend at an angle within about ±10° of true perpendicular to said slit.

8. A lighting structure for intensely illuminating a narrow linear region, said structure comprising:
   (a) a hollow, elongate light guide having a longitudinal axis;
   (b) a light source for emitting light into an end of said light guide;
   (c) a longitudinal slit light-emitting aperture extending through an external wall of said light guide substantially parallel to said axis;
   (d) a lens mounted in said slit aperture, said lens bearing a plurality of prisms extending substantially perpendicular to said slit on an inwardly directed face of said lens; and
   (e) a diffuser mounted outwardly of said lens, said diffuser bearing a plurality of thin striations extending transversely relative to said longitudinal slit aperture.

9. The lighting structure as defined in claim 8 wherein said lens is a film material.

10. The lighting structure as defined in claim 8 further comprising a mechanism for maintaining said lens flat.

* * * * *